United States Patent [19]

Tada et al.

[11] Patent Number: 5,111,722
[45] Date of Patent: May 12, 1992

[54] BELT-SHAPED MEMBER SUPPLYING METHOD AND APPARATUS

[75] Inventors: Shigeru Tada, Tokyo; Jun Nagano, Tokorozawa; Yoshihiro Fukamachi, Tokyo, all of Japan

[73] Assignee: Bridgestone Corporation, Tokyo, Japan

[21] Appl. No.: 612,363

[22] Filed: Nov. 14, 1990

[30] Foreign Application Priority Data

Nov. 24, 1989 [JP] Japan .................. 1-303163

[51] Int. Cl.$^5$ ............................................. B29D 30/30
[52] U.S. Cl. .................................. 83/23; 83/34; 83/56; 83/79; 83/152; 83/153; 83/358
[58] Field of Search ............... 83/23, 34, 56, 79, 100, 83/151, 152, 153, 358, 581; 156/256, 250, 517, 510, 405.1

[56] References Cited

U.S. PATENT DOCUMENTS

| | | | |
|---|---|---|---|
| 3,859,152 | 1/1975 | Brey et al. | 156/256 |
| 4,465,536 | 8/1984 | Makino et al. | 156/405.1 |
| 4,485,712 | 12/1984 | Gerber | 83/100 |
| 4,832,243 | 5/1989 | Usami | 156/405.1 |
| 4,867,434 | 9/1989 | Okuyama et al. | 83/151 |
| 4,975,134 | 12/1990 | Mogi et al. | 156/405.1 |

FOREIGN PATENT DOCUMENTS

| | | | |
|---|---|---|---|
| 63-93426 | 4/1988 | Japan . | |
| 63-116838 | 5/1988 | Japan | 30/30 |
| 64-30738 | 2/1989 | Japan . | |
| 2-270542 | 11/1990 | Japan . | |

*Primary Examiner*—Frank T. Yost
*Assistant Examiner*—Allan M. Schrock
*Attorney, Agent, or Firm*—Sughrue, Mion, Zinn, Macpeak & Seas

[57] ABSTRACT

The belt-shaped member supplying method and apparatus are used for cutting a long material paid out of a winding roll into a belt-shaped member of a predetermined length and supplying the belt-shaped member onto a winding drum by means of a transfer device. The method includes steps of modifying an extending direction of a front edge of a long material, whose initial front end portion has been cut off, into a desired direction by applying an external force upon a front end portion of the long material, holding the front end portion of the long material, paying out the long material of a predetermined length, cutting the paid long material to form a belt-shaped member, modifying an extending direction of a rear edge of the belt-shaped member into a desired direction by applying an external force upon a rear end portion of the belt-shaped member, holding the rear end portion of the belt-shaped member, transferring the entire belt-shaped member to a predetermined position, taking up any slack of the belt-shaped member, holding the belt-shaped member against a plate-shaped transfer device, and moving the plate-shaped transfer device together with the belt-shaped member to the winding drum.

13 Claims, 13 Drawing Sheets

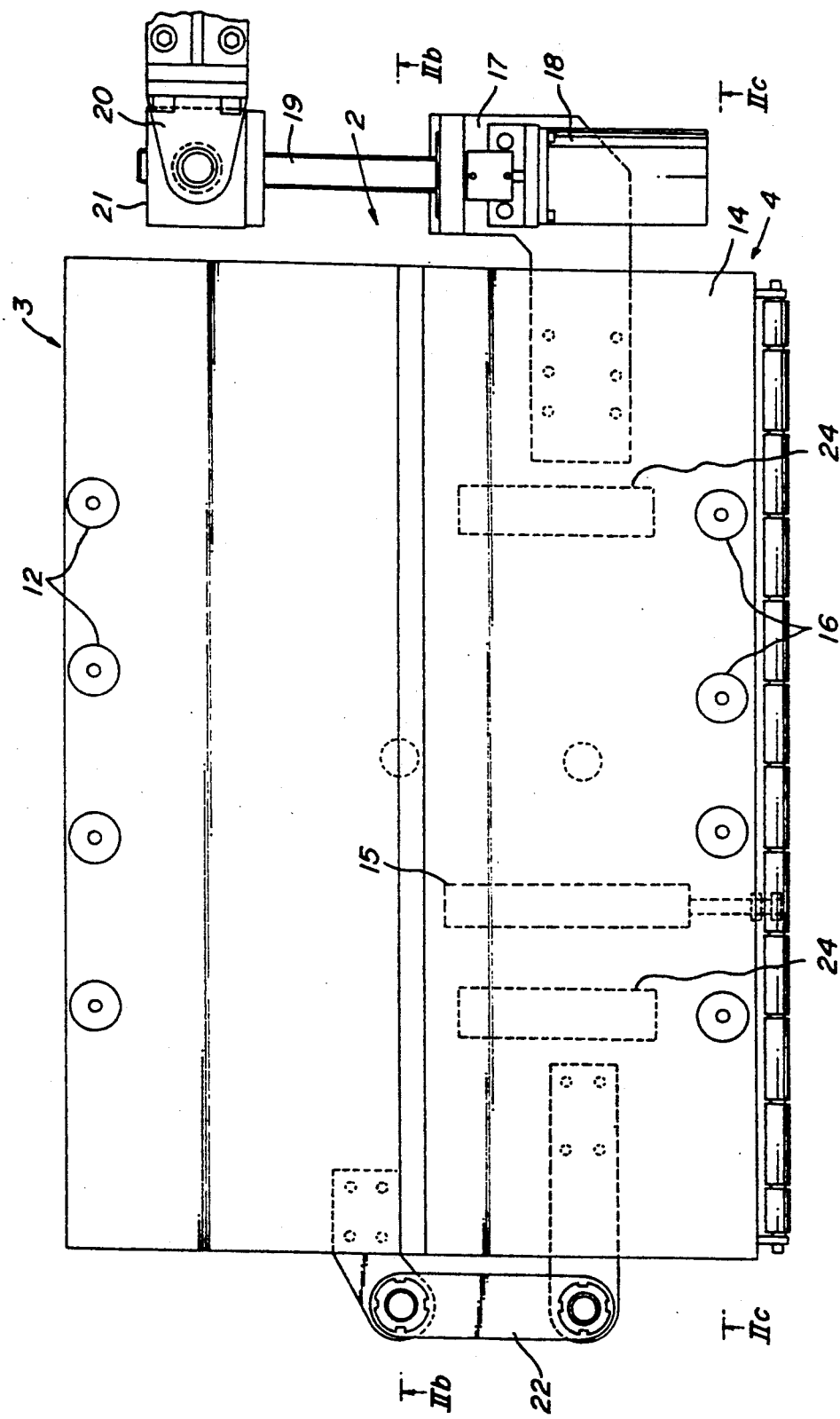
FIG._2a

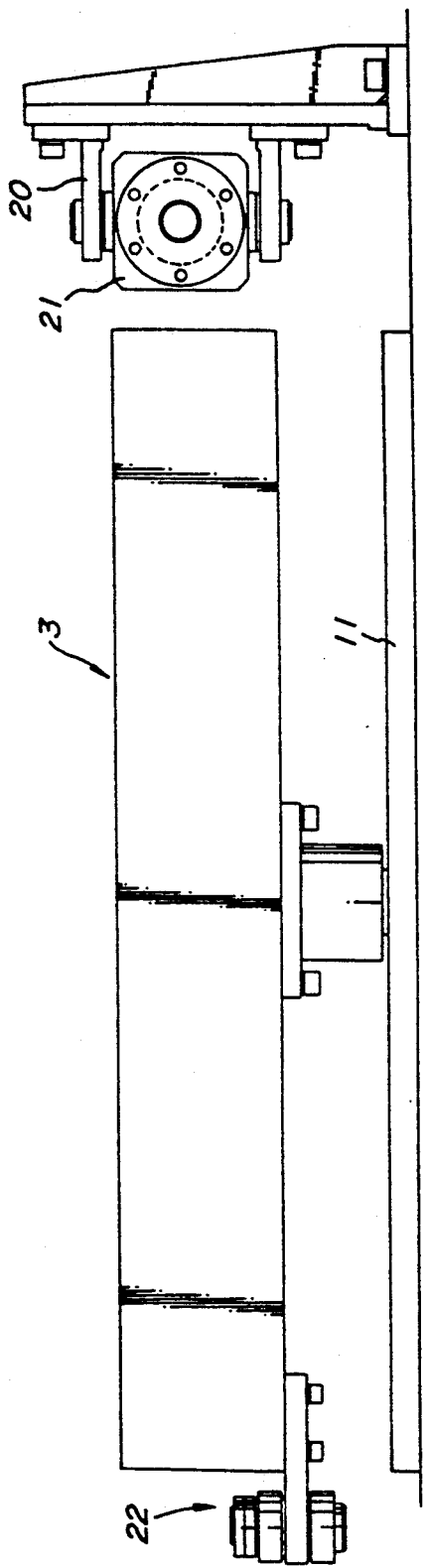
FIG_2b
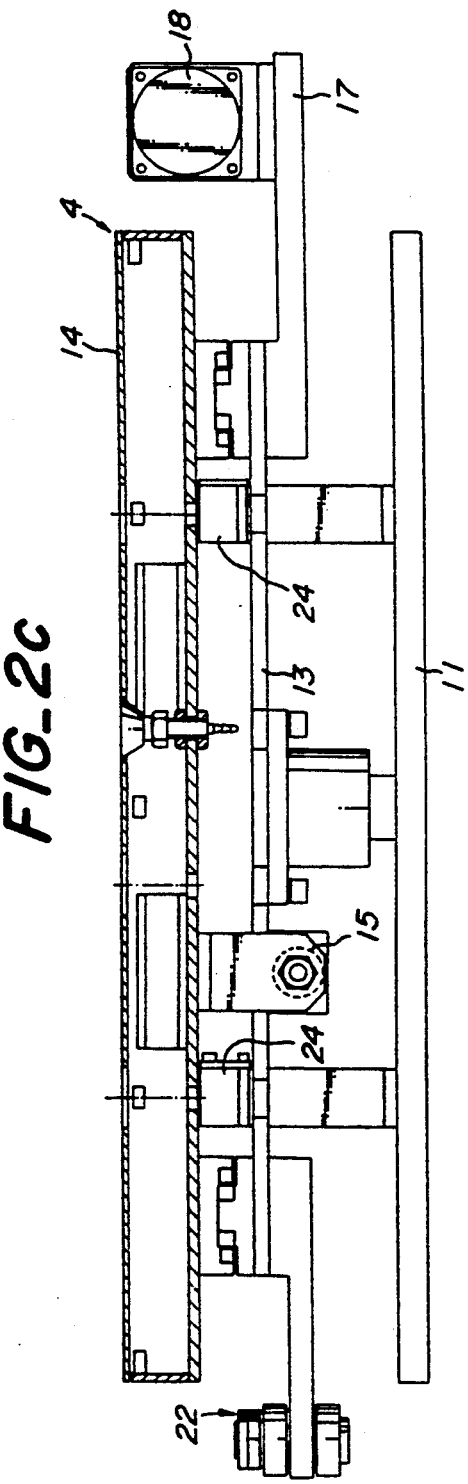
FIG_2c

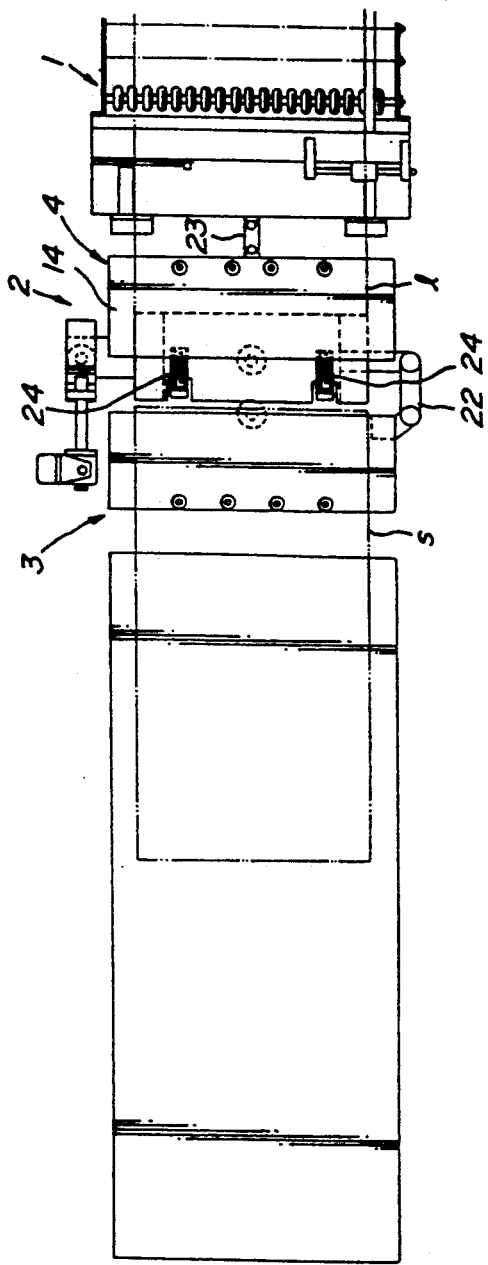
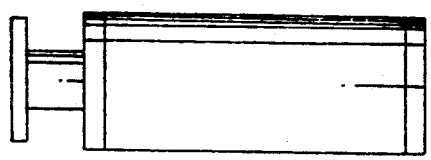
FIG_3a
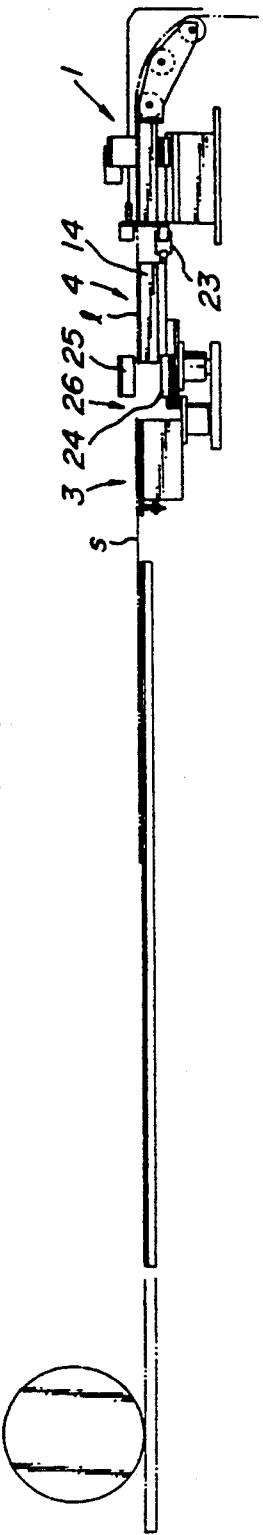
FIG_3b

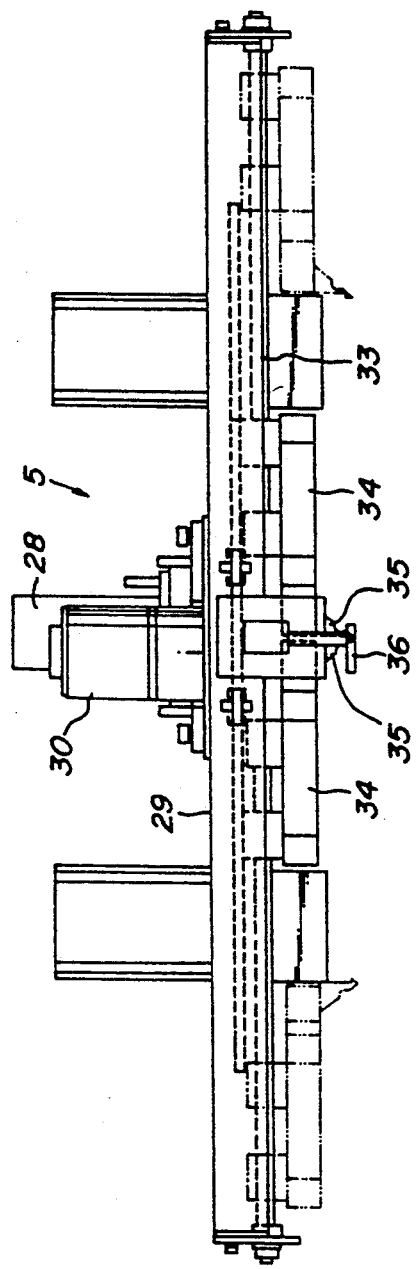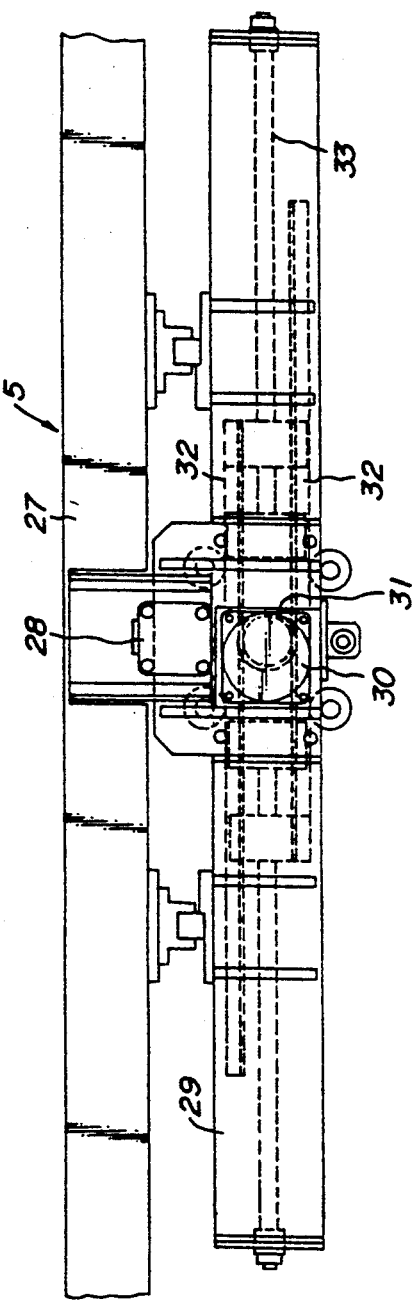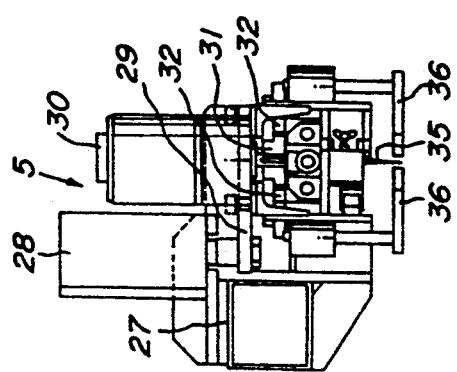

FIG_5b
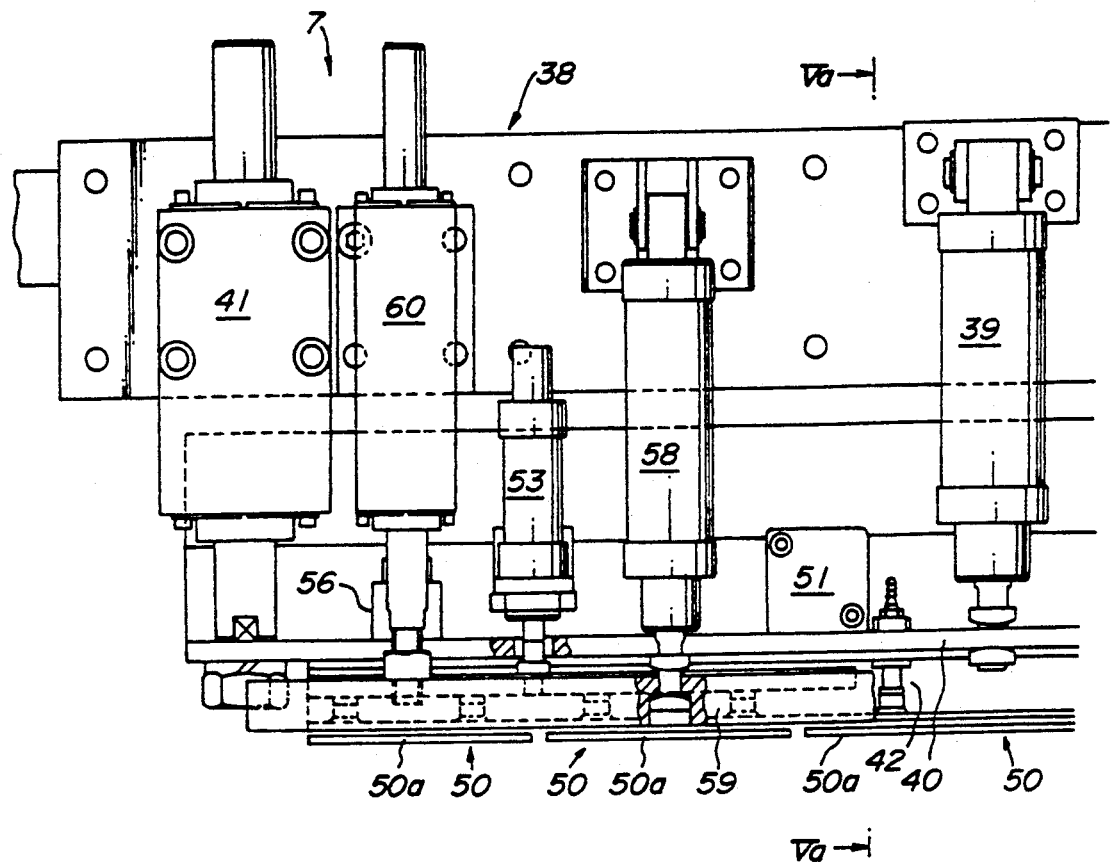
FIG_5c
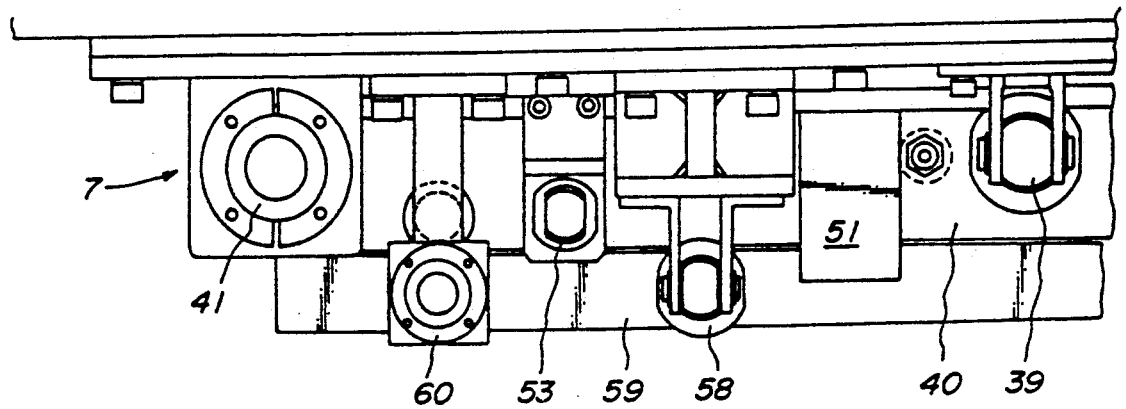

FIG_8
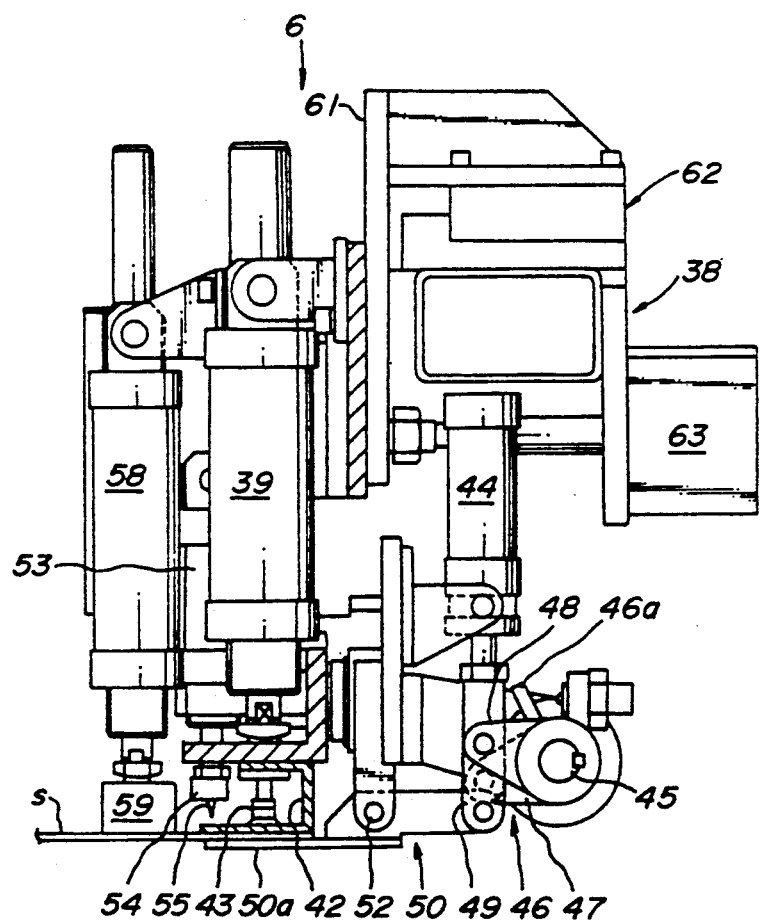

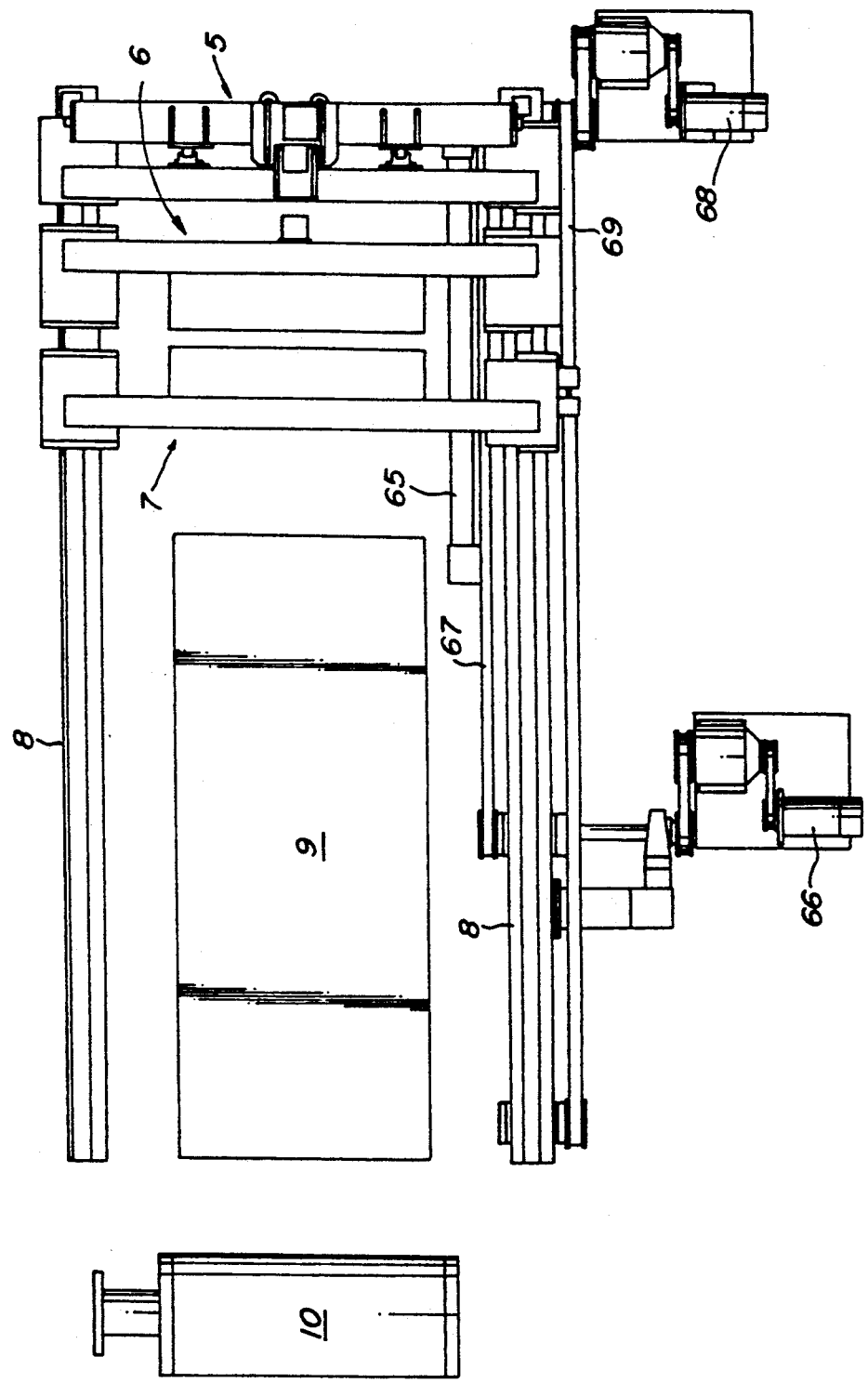
FIG._9a

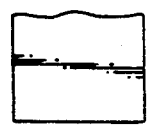
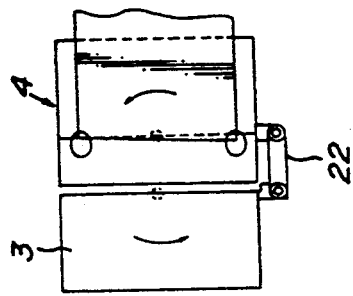
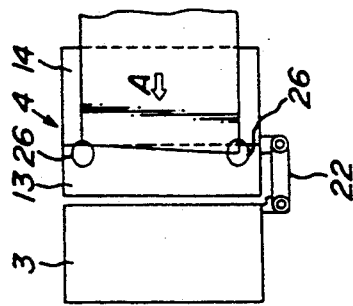
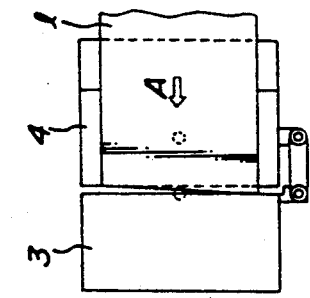
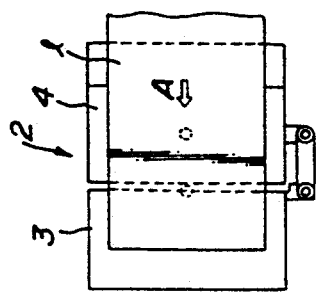
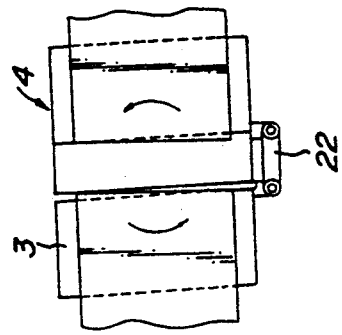
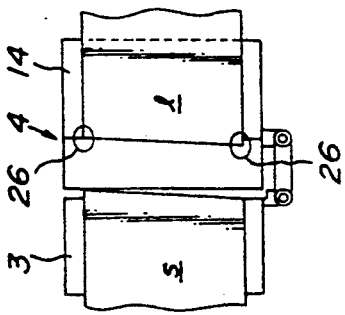
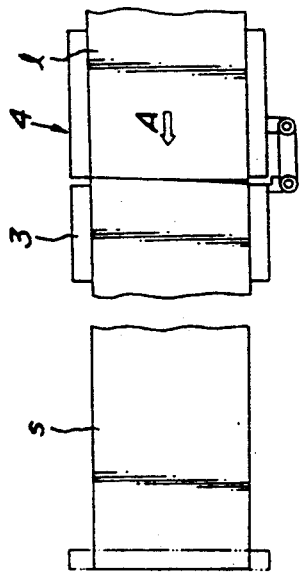

BELT-SHAPED MEMBER SUPPLYING METHOD AND APPARATUS

BACKGROUND OF THE INVENTION

This invention relates to a method and an apparatus for supplying a belt-shaped member to a winding drum. For example, a ply cord such as tire carcass, belt or the like which is paid out of a winding roll and cut into a predetermined length, while an extending direction of cords constituting the belt shaped member is maintained exactly in coincident with a predetermined direction.

In a hitherto widely used prior method of winding a rubber coated ply cord of a tire carcass around a winding drum, after manually cutting off the rubber coated ply cord along cords included therein into a predetermined length, the obtained belt-shaped ply cord thus obtained is wound around the winding drum. In another used method, after winding a rubber coated ply cord around a winding drum, the wound ply cord is cut off along cords thereof. In recent years, particularly, various attempts have been made to automatize the above cutting and winding operations.

On the other hand, it is usual that cords constituting rubber coated ply cords extend in directions somewhat different from predetermined directions. It is therefore difficult to obtain an exact rectangular or parallelogrammic belt-shaped member by cutting off the ply cords without regard to manual or mechanical operation so long as the cutting is along the cords. The belt-shaped members obtained are trapezoid in most cases. Accordingly, when such an inaccurately formed member is wound around a winding drum over its circumference, overlapped front and rear ends of the member are not parallel to each other in a width direction of the material. Therefore, the front end overlaps the rear end at one edge but frequently does not overlap at the other edge of the member. Even if they completely overlap, the overlapped amount changes in the width direction.

In the prior art, therefore, a manual correcting operation for the overlapped portion is invariably required even if the cutting and winding operation are automated. If the overlapped amount is increased in order to avoid such a manual correcting operation, the increased overlapped amount lowers the yield rate of ply cords and the uniformity of a tire.

SUMMARY OF THE INVENTION

It is an object of the invention to provide a method and an apparatus for supplying a belt-shaped member to a winding drum, which eliminates all the disadvantages of the prior art and enable front and rear end portions of a belt-shaped member to be correctly overlapped in automated cutting and supplying operations without requiring any manual correcting operation, even if cords constituting the belt-shaped member extend in wrong directions.

In order to accomplish this object, in a belt-shaped member supplying method for cutting a long material paid out of a winding roll into a belt-shaped member of a predetermined length and supplying the belt-shaped member onto a winding drum by means of a transfer means, the method according to the invention comprises steps of modifying an extending direction of a front edge of a long material, whose initial front end portion has been cut off, into a desired direction by applying an external force upon a front end portion of the long material, holding the front end portion of the long material, paying out the long material of a predetermined length, cutting the paid long material to form a belt-shaped member, modifying an extending direction of a rear edge of the belt-shaped member into a desired direction by applying an external force upon a rear end portion of the belt-shaped member, holding the rear end portion of the belt-shaped member, transferring the entire belt-shaped member to a predetermined position, taking up any slack of the belt-shaped member, holding the belt-shaped member against plate-shaped transfer means, and moving the plate-shaped transfer means together with the belt-shaped member to the winding drum.

An apparatus for supplying a belt-shaped member according to the invention comprises a cutting table for holding a long material paid out of a winding roll, a cutter unit for cutting the long material on the cutting table, sensor means for detecting extending directions of cut edges of the material cut by the cutter unit, front end grasping means for holding a front end portion of the long material to pay out a predetermined length of the long material, rear end grasping means for holding a rear end portion of a belt-shaped member obtained by cutting off the long material and transferring the belt-shaped member to a predetermined position in cooperation with the front end grasping means, plate-shaped transfer means for receiving the belt-shaped member from the front and rear end grasping means and supplying the belt-shaped member, while holding it at a predetermined position, to a winding drum, and tension giving means provided on at least one of said front and rear end grasping means for giving tensile force to the belt-shaped member supported by the front and rear end grasping means, and said cutting table comprising a forward table arranged on a forward side of a transfer direction of the belt-shaped member and a rearward table movable toward and away from the forward table, said forward and rearward tables being rotatable in unison about their respective pivoted positions which are at centers of their widths and the former pivoted position being at a rear edge of the forward table and the latter pivoted position being at a front edge of the rearward table which has retracted from the forward table.

According to the supplying method of the invention, after modifying an extending direction of a front edge of a long material, whose initial front end portion has been removed, with the aid of partial deformation of the long material in an extending plane caused by an external force, the front end portion of the long material is held in the modified state by means of the front end grasping means, thereby enabling the extending direction of the front edge of the long material to be maintained in a desired direction. The long material of a predetermined length is then paid out by means of the front end grasping means and the paid long material is cut off to obtain a belt-shaped member of a predetermined length. An extending direction of a rear edge of the belt-shaped member is modified by an external force acting upon the rear end portion of the belt-shaped member. The rear end portion of the member is held in the modified state by means of the rear end grasping means, thereby enabling the extending direction of the rear edge of the belt-shaped member to be also maintained in the desired direction.

Thereafter, keeping the modified extending directions of the front and rear edges of the belt-shaped member, tensile force is applied to the belt-shaped member so as to take up any slack in the belt-shaped member caused by the modification of the edges and the others to bring the belt-shaped member into the form of a sufficiently exact parallelogram having suitable dimensions. The belt-shaped member is then held by suction against the plate-shaped transfer means in position thereon without changing the shape and size of the belt-shaped member. Further, the plate-shaped transfer means is moved together with the belt-shaped member to a position below the rotating winding drum, thereby supplying and winding the belt-shaped member to and around the winding drum.

As can be seen from the above explanation, all the operations from cutting to supplying the belt-shaped member can be completely automated relatively easily. Moreover, after modifying the extending directions of front and rear edges and removing any slack, the belt-shaped member with intended size and shape is supplied to the winding drum. Therefore, the front and rear end portions of the belt-shaped member are properly overlapped with each other on the winding drum, thereby preventing insufficient overlapping and change in overlapping amount in a width direction of the winding drum.

In the apparatus for supplying a belt-shaped member according to the invention, the cutting table for holding paid out long material by vacuum suction, electrostatic attraction or the like comprises a forward table positioned forwardly of the transferring direction of the belt-shaped member and having holding means, and a rearward table movable toward and away from the forward table and also having holding means. These forward and rearward tables are rotatable in unison about pivoted axes which are at centers of their widths, former being at a rear edge of the forward table and latter being at a forward edge of the rearward table retracted rearward. An extending direction of a rear edge of a belt shaped member formed by cutting the long material by means of the cutter unit and held by the forward table and an extending direction of a front edge of a remaining long material held by the rearward table are detected by directly detecting the extending direction of the front edge of the long material, for example, by means of sensors provided in association with the rearward table. Since the extending directions are different from desired directions in most cases, the forward and rearward tables are rotated in the same direction and through the same angle corresponding to difference between the detected directions and the desired direction. As a result, the extending directions of the rear edge of the belt-shaped member and the front edge of the long material are simultaneously and exactly brought into desired direction with the aid of deformation of the front and rear end portions in extending planes.

The front end portion of the belt-shaped member having the predetermined length is held by the front end grasping means, keeping the front edge in the modified state, while the rear end portion of the belt-shaped member is also held by the rear end grasping means having a suction mechanism, a clamping mechanism and others, keeping the rear edge in the modified state. The belt-shaped member is then raised and transferred to a predetermined position in cooperation with the front and rear end grasping means. At this time, any slack in the belt-shaped member is completely taken up by means of a tension giving mechanism provided on at least one of the front and rear end grasping means, for example, on the rear end grasping means so that the belt-shaped member is brought into desired size and shape. The belt-shaped member is then delivered to the plate-shaped transfer means without causing any deformation of the belt-shaped member.

On the other hand, the plate-shaped transfer means is then moved, holding by suction the belt-shaped member in the delivered state, to a position below the winding drum where the belt-shaped member is supplied onto the winding drum.

Therefore, according to the apparatus of the invention all the operations from cutting to supplying the belt-shaped member of a predetermined length are carried out automatically without requiring any manual operation. Moreover, the supplied belt-shaped member has the desired length and shape by substantially completely correcting errors in cutting. Therefore, the front and rear end portions of the belt-shaped member overlap with a proper amount without requiring any modifying the overlapping portion after winding the member around the winding drum.

The invention will be more fully understood by referring to the following detailed specification and claims taken in connection with the appended drawings.

BRIEF DESCRIPTION OF THE DRAWINGS

FIGS. 2a, 2b and 2c are a plan, a side and a sectional view illustrating the cutting table used in the apparatus shown in FIG. 1;

FIGS. 3a and 3b are a plan and a side view illustrating a connection between the cutting table and associated components used in the apparatus;

FIGS. 4a, 4b and 4c are a front, a side and a plan view illustrating the cutter unit used in the apparatus;

FIGS. 5a, 5b and 5c are a sectional side, a partial sectional front and a partial plan view illustrating the front end grasping means used in the apparatus;

FIG. 6 is a side view of a vacuum pad used in the front end grasping means shown in FIG. 5a;

FIG. 8 is a sectional side view illustrating the rear end grasping means used in the apparatus;

FIGS. 9a and 9b are a plan and a front view illustrating driving mechanisms for the cutter unit and the front and rear end grasping means;

FIGS. 10a to 10h are plan views illustrating the processes for modifying extending directions of edges of a long material and a belt-shaped member.

EXPLANATION OF THE PREFERRED EMBODIMENTS

Figure 1:
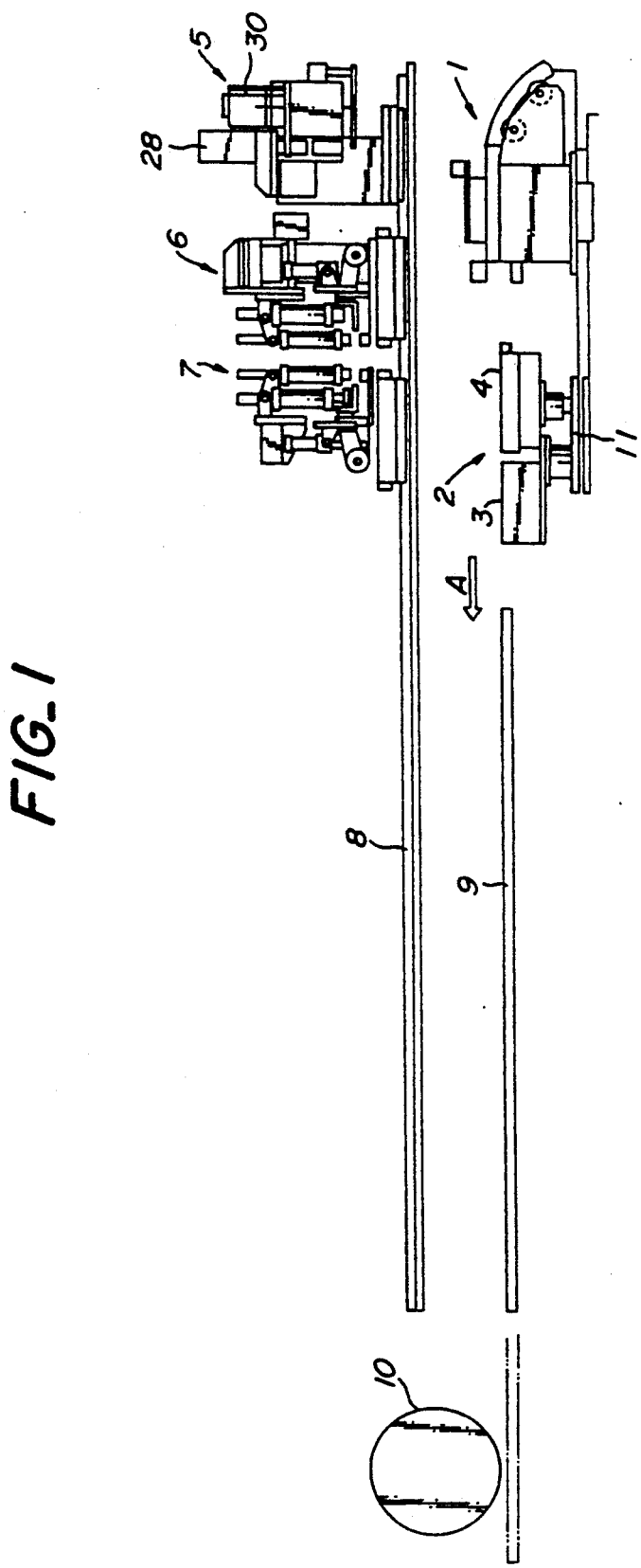
FIG. 1 is a schematic side view conceptually illustrating an apparatus according to the invention.

FIG. 1 is a schematic side view conceptually illustrating one embodiment of the apparatus according to the invention. The apparatus includes a payout table 1 for paying a long length of material out of a winding roll (not shown), and a cutting table 2 for holding the paid out long material for the purpose of cutting the held long length material by means of a cutter unit later described. The cutting table 2 is arranged on a forward side of a transfer direction of a belt-shaped member later described as shown by an arrow A. In this embodiment, the cutting table 2 comprises a forward table 3 having a plurality of vacuum pads and a rearward table 4 movable toward and away from the forward table 3 and also having a plurality of vacuum pads.

As shown in FIG. 1, there are provided a cutter unit 5, a rear end grasping means 6 and a front end grasping means 7 arranged successively from an upstream to a downstream side of the transfer direction of the belt-shaped material on common rails. Both unit 5 and the grasping means 6 and 7 are freely movable on the common rails 8 within ranges not causing any interference with each other and have operation portions which are vertically movable relative to the cutting table 2 by means of cylinders and the like, respectively.

Plate-shaped transfer means 9 is arranged on a forward side of the cutting table 2 in the transfer direction of the belt-shaped member. The plate-shaped transfer means 9 comprises an electrostatic suction plate for attracting the belt-shaped member delivered thereat and is reciprocatively movable through a long distance and to a position immediately below a winding drum 10 by means of driving means such as rack and pinion or the like (not shown).

As shown in FIGS. 2a and 2b illustrating the forward table 3 constituting a part of the cutting table 2 in a plan view and a front elevation, the forward table 3 is substantially in the form of a box as a whole and pivotally supported at a center of its width at the rear end on a base plate 11 so that the forward table 3 is freely rotatable in a horizontal plane about a pivotally supported axis. A plurality (four in this embodiment) of vacuum pads 12 are provided in a row in the width direction on the forward portion of the box-shaped forward table 3.

The rearward table 4 also constituting a part of the cutting table 2 is provided with a lower frame 13 whose substantially center portion is pivotally supported on the base table 11 at a position somewhat spaced rearward from the forward table 3 as shown in FIGS. 2a and 2b in the front and sectional views, respectively. On the lower frame 13 is arranged a box shaped structure 14 movable forward and rearward relative to the lower frame 13. The box-shaped structure 14 is driven forward and rearward relative to the lower frame 13 by means of a cylinder provided between the box-shaped structure 14 and the lower frame 13.

With this arrangement, the box-shaped structure 14 is advanced and retracted between an advanced position where a front edge of the box-shaped structure 14 is spaced, for example, 10 to 20 mm from a rear edge of the forward table 3 and a retracted position substantially coincident with a center of the pivoted point of the lower frame 13. Four vacuum pads 16 of the rearward table 4 are arranged in a row in the width direction on the rearward portion of the box-shaped structure 14.

On one side of the rearward table 4, the lower frame 13 is provided with a bracket 17 fixed thereto, on which is fixed a motor 18 having an output shaft to which is fixed a male screw member 19. A female screw member 21 is pivotally connected to a stationary bracket 20 so as to be rotatable in a horizontal plane. A free end of the male screw member 19 is threadedly engaged in the female screw member 21. Moreover, the forward table 3 is integrally rigidly connected to the lower frame 13 of the rearward table 4 by an arm member 22.

Upon energizing the motor 18, the bracket 17 is moved toward or away from the female screw member 21 to perform the rotation of the forward table 3 and the rearward table 4 of the cutting table 2 about the respective pivoted points. In other words, the rearward table 4 is directly rotated about its pivoted point, and such rotation of the rearward table 4 causes a displacement of the arm member 22 This in turn causes the forward table 3 to rotate about its pivoted point through the same rotating arc and in the same direction as those of the rearward table 4.

In this case, the rearward table 4 or the box-shaped structure 14 is connected to the payout table 1 by means of a universal joint 23 permitting the above rotation of the tables 3 and 4 smoothly with a great certainty in a retracted position of the rearward table 4 or the box-shaped structure 14 as shown in FIG. 3a and 3b. As a result of the connection by the universal joint, the payout table 1 is moved together with the box-shaped structure in the advancing or retracting direction by means of the universal joint 23.

The direction of a direction of a cut edge of the long material or a belt-shaped member on the cutting table 2 or between the forward table 3 and the rearward table 4 is needed. For this purpose, as exemplarily shown in FIGS. 3a and 3b there are provided two sensors 26 spaced in the width direction of the rearward table 4. Each sensor 26 comprises a light emitting means 24 arranged on the lower frame 13 below the box-shaped structure 14 and a light receiving means 25 arranged in opposition to the light emitting means 24 above the box-shaped structure 14 and movable in vertical directions.

With this arrangement, sensors 26 serve to detect positions where the cut edges of the materials pass the sensors 26. Therefore, extending directions of the cut edges of the material can be detected on the basis of the passing positions of the cut edges.

With the arrangement shown in FIGS. 3a and 3b, only the extending direction of the forward edge of the long material 1 is detected, while there is not provided any particular detecting means for detecting extending directions of rearward edge of a belt-shaped member S cut in a predetermined length from the long material 1. However, the forward edge of the long material and the rearward edge of the belt-shaped member are formed by one cutting operation by the cutter unit 5. The forward edge of the long material and the rearward edge of the belt-shaped member should to extend in the same direction, so long as both the long material 1 and the belt-shaped member S cut therefrom are rigidly held against the rearward table 4 and the forward table 3 by suction caused by the vacuum pads 16 and 12 so that displacements of these materials are sufficiently restrained. Consequently, the extending direction of the rearward edge of the belt-shaped member S is substantially coincident with the extending direction of the forward edge of the long material 1 without requiring any separate detection of the rearward edge of the belt-shaped member s.

FIGS. 4a, 4b and 4c illustrate the cutter unit in a front elevation, a partial sectional side view and a plan view. The cutter unit 5 is movable on the common rails 8 and supports a movable frame 29 to be raised and lowered by means of a cylinder 28 mounted on a stationary frame 27. On the movable frame 29 a motor 30 is mounted whose output shaft has a pinion 31 fixed thereto. The pinion 31 is in mesh with two racks 32 at diametrically opposed positions of the pinion 31. One guide rod 33 is horizontally arranged on the movable frame 29. Cutter holders 34 are fixed to the racks 32, respectively, and guided by the guide rod 33 in its slidable movement therealong. Two cutting blades 35 form a pair of cutters, each in the form of a right-angled triangle viewed in a front elevation and secured to each of the cutter holders 34.

Two restraining means 36 are arranged on both sides of the cutting blades 35 and urge the long material 1 against the cutting table 2 when the cutter unit 5 is lowered.

In the cutting operation, the cutter unit 5 is moved on the common rails in the horizontal direction to a position between the forward table 3 and the rearward table 4 advanced toward the table 3. When the cylinder 28 is then actuated to lower the movable frame 29 relative to the stationary frame 27 so that the long material 1 is urged against both the tables 3 and 4 and simultaneously the cutting blades 35 pierce into the long material 1. Thereafter, the motor 30 is energized to rotate the pinion 31 so that the cutting blades 35 are moved away from each other as shown in phantom lines in FIG. 4a, thereby cutting the long material 1 into a belt-shaped member S.

Figure 5A:
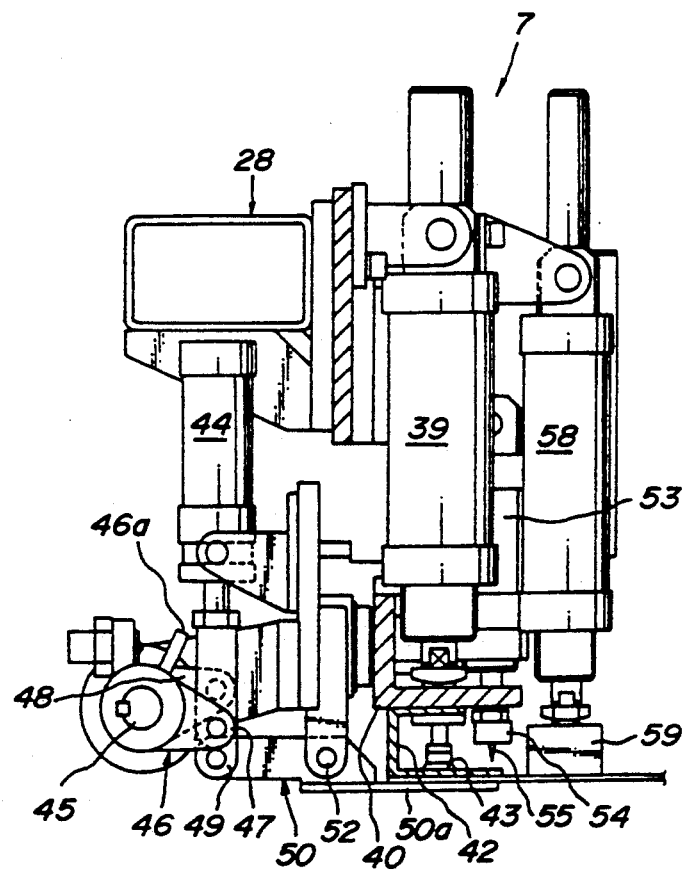
Figure 6:
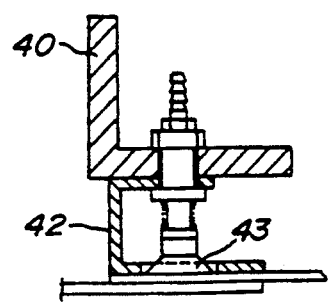

FIGS. 5a, 5b and 5c exemplarily illustrate the front end grasping means 7 in a partial sectional side view, a front elevation and a partial plan view. A movable frame 40 having an L-shaped section is connected to a stationary frame 38 by means of a cylinder 39 and guided in vertical movements relative to the stationary frame 38 by guide means 41 provided at both ends of the movable frame 40. To a lower surface of the movable frame 40 is secured a channel-shaped member 42 having a U-shaped section. The channel-shaped member 42 is provided with a plurality of vacuum pads 43 whose end openings are exposed through through-holes formed in the channel-shaped member 42 as shown in FIG. 6.

With this arrangement, an underside of the channel-shaped member 42 is brought into contact with a front end portion of the long material 1 or the belt-shaped member s and vacuum pressure is applied to the vacuum pads 43 so that the front end portion of the long material 1 or the belt-shaped member S is sufficiently rigidly held by suction caused by the front end grasping means 7.

On an opposite side of the movable frame 40 with respect to the cylinder 39 or a forward side, a cylinder 44 is vertically arranged, whose rod end is connected to a lower arm 47 of a bell crank 46 fixed to a shaft 45. An upper arm 48 of the bell crank 46 is connected through a link member 49 to a rocking lever 50. These members are all movable toward and away from the movable frame 40 by a horizontal cylinder 51. The rocking lever 50 is provided with a plate portion 50a as a clamper at one end extending toward the channel-shaped member 42.

In this case, the lower arm 47 and the upper arm 48 may be plural and arranged in an axial direction. A plurality of upper arms 48 may be fixed to one shaft so that a plurality of rocking levers 50 may be simultaneously operated. Such an example is shown in FIG. 5b.

With this arrangement as above described, the horizontal cylinder 51 is actuated to move the cylinders 44 and others to the nearest position to the movable frame 40. Under this condition, the cylinder 44 is actuated to rotate the lower arm 47 and hence the upper arm 48 together with the shaft 45 so that the rocking lever 50 is rocked about a pin 52 provided at an intermediate portion of the rocking lever 50. Upon extending the piston rod of the cylinder 44, the front end portion of the long material 1 is embraced between the plate portion 50a of the rocking lever 50 and the underside of the channel-shaped member 42 as shown in FIG. 5a separately from the holding by suction caused by the vacuum pads as above described.

On the other hand, upon retracting the piston rod of the cylinder 44, the lower arm 47 and the upper arm 48 are rotated together upwardly. As a result, the plate portion 50a of the rocking lever 50 leaves the channel-shaped member 42. In other words, the long material 1 or the belt-shaped member S is released from the clamped condition. The movement of the plate portion 50a away from the channel-shaped member 42 is limited by an abutment of a stopper 46a provided on the bell crank 46 against a spring plunger.

In the front end grasping means 7, a cylinder 53 is mounted on the movable frame 40 on the same side of the cylinder 39 with respect to the movable frame 40, and a piston rod of the cylinder 53 extends through the horizontal portion of the movable frame 40 and whose rod end is connected to a horizontal extending lift rod 54. A plurality of needles 55 forming pairs of two needles are provided on an underside of the lift rod 54 and extending therefrom. The needles 55 are adapted to enter through-holes (not shown) formed in a lower horizontal flange of the channel-shaped member 42 and the plate portion 50a of the rocking lever 50.

Figure 7:
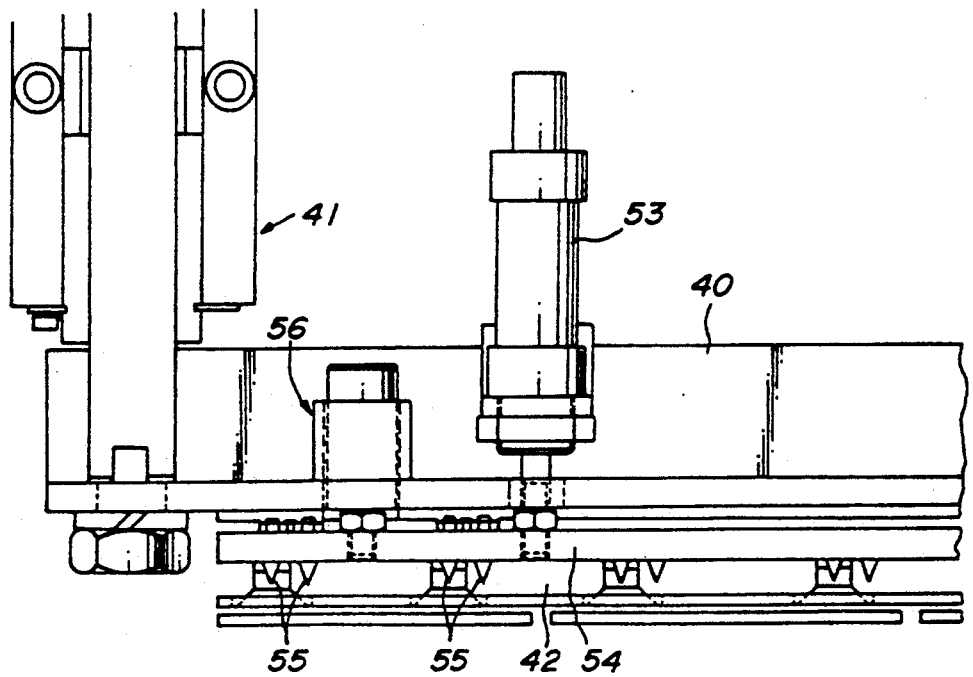
FIG. 7 is a front elevation illustrating the lift rod and needles used in the front end grasping means.

As shown in FIG. 7, guide means 56 is provided for guiding the lift rod 54 in vertical movements relative to the movable frame 40.

With the above arrangement, under the condition of the long material 1 with the front end portion being held by suction caused by the vacuum pads 43 and between the channel-shaped member 42 and the rocking lever 50, the cylinder 53 is actuated to extend its piston rod to lower the lift rod 54 and hence to cause the penetration of the needles 55 into the long material 1, thereby ensuring the reliable holding of the long material 1.

In addition thereto, a cylinder 58 is mounted on the stationary frame 38 on the same side of the cylinders 39 and 53 in the manner greatly extending from the stationary frame 38. To the rod end or the lower end of the piston rod of the cylinder 58 is connected a restraining block 59 also horizontally extending. The restraining block 59 is guided in vertical movements relative to the stationary frame 38 by means of guide means 60.

FIG. 8 illustrates the rear end grasping means 6 in a side view. The rear end grasping means 6 is similar in the majority of components to the front end grasping means 7 above described, although the component are arranged in opposite directions. Therefore, only different parts will be explained and the like components will be designated by the same reference numerals.

In the rear end grasping means 6, a vertical plate 61 on which cylinders 39 and 58 and guide means 41 and 60 are directly mounted is separated from a stationary frame 38. The vertical plate 61 is horizontally moved relative to the stationary frame 38 and guided by a straight guide 62 arranged on a side opposite to the cylinders 39 and 58 with respect to the vertical plate 61. Moreover, a piston rod of a cylinder 63 mounted on the stationary frame 38 and directing in a horizontal direction is connected to the vertical plate 61.

With the rear end grasping means 6, a rear end portion of a belt-shaped member S whose front end portion is held by the front end grasping means 7 is held by suction caused by vacuum pads 43 and further held by clamping with a channel-shaped member 42 and a rocking lever 50. Moreover, with the belt-shaped member being held by needles in addition to the vacuum pads and the rocking lever, the cylinder 63 is actuated to move the vertical plate 61 toward the stationary frame 38 with the aid of the straight guide 62. The result is that various slack in the belt-shaped member S are sufficiently taken up and at the same time tensile forces, elongations and the like can be given to the belt-shaped member S if required.

Figure 9B:
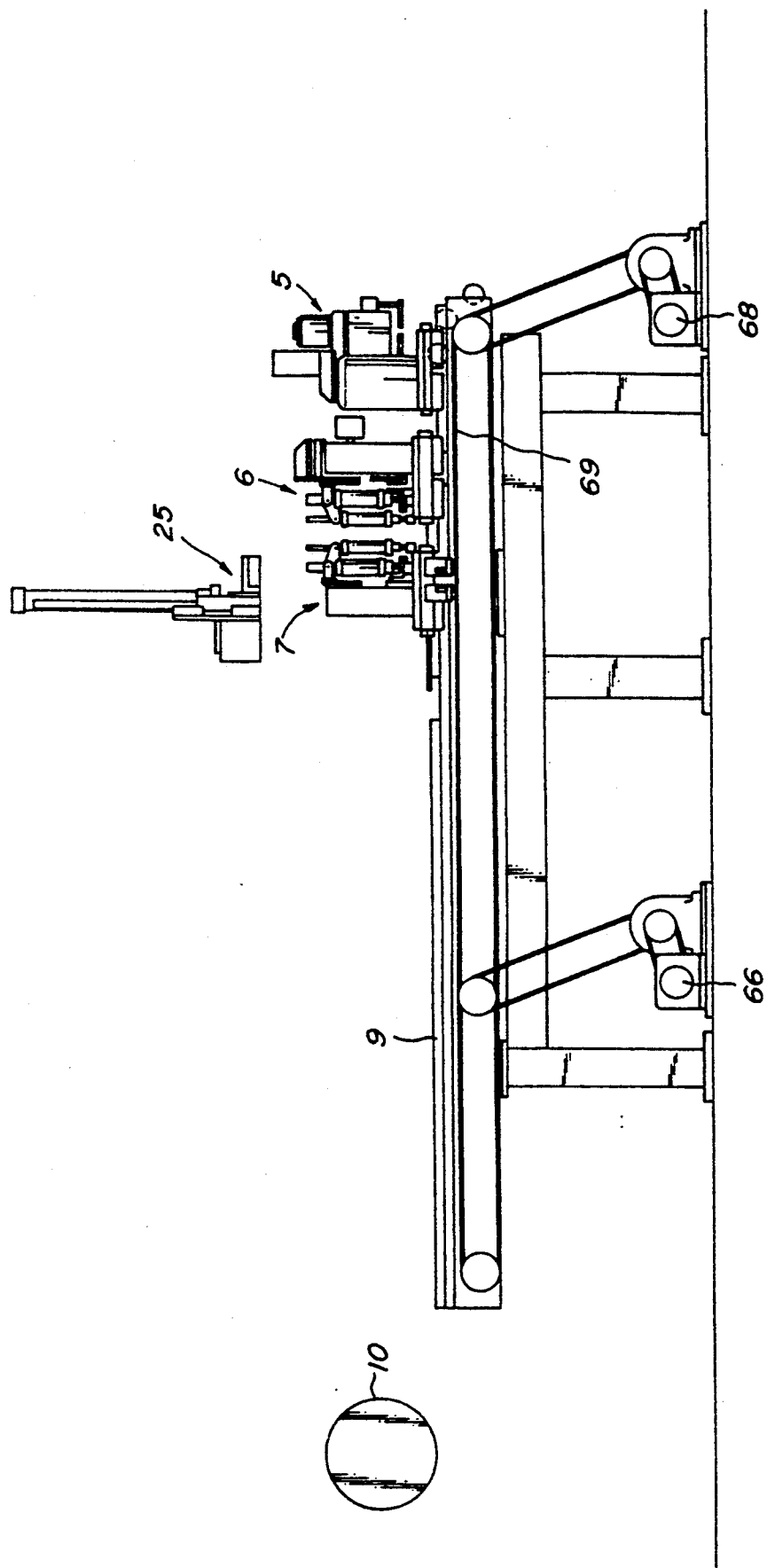

FIGS. 9a and 9b illustrate a driving system for the cutter unit 5, the rear end grasping means 6 and the front end grasping means 7 in a plan view and a side view. Both the unit 5 and the grasping means 6 and 7 has wheels of two kinds, one only rolling on one of the common rails 8 and the other having a construction embracing the other rail 8.

In this case, the cutter unit 5 is arranged nearer to one of the common rails 8 and driven on the rails 8 by means of a cylinder 65 in parallel with the rails 8 between a rest position shown in FIG. 9a and a predetermined cutting position. The rear end grasping means 6 is driven on the common rails 8 by a timing belt 67 which is connected to a bottom portion of the rear end grasping means 6 and driven by a motor such as servomotor through a speed change device. The front end grasping means 7 is driven on the common rails 8 by a timing belt 69 which is connected to a bottom portion of the front end grasping means 7 and driven by a separate motor 68.

The operation of the apparatus constructed as above described will be explained hereinafter.

Referring to FIG. 1, first a front end portion of a long material 1 paid out from a winding roll (not shown) is fed through a payout table 1 to the rearward table 4 and hence the cutting table 2 whose box-shaped structure 14 is advanced to the forward table 3. As shown in FIG. 10a in a plan view, the long material 1 is set on the cutting table 2 and is held by suction caused by the vacuum pads at least on the rearward table 4. Thereafter, the cutter unit 5 is driven to a position between the forward and rearward tables 3 and 4, where the cylinder 28 and the motor 30 of the cutter unit 5 are actuated to perform cutting of the long material 1 by means of the two cutting blades 35.

In this case, in the event, for example, where the long material 1 is a tire ply cord, it includes a number of reinforcing cords extending in width directions of the material. The cords tend to incline somewhat in any direction relative to desired directions perpendicular to the transfer direction A of the long material 1. Therefore, when the the long material 1 is cut along the reinforcing cord by means of the cutting blades 35, an extending direction of the cut front edge is also inclined relative to the direction perpendicular to the transfer direction A of the long material 1 with the same amount and in the same direction as those of the reinforcing cord as shown in FIG. 10b.

If the desired extending direction of the front edge of the long material 1 is, for example, the direction perpendicular to the transfer direction of the long material 1, the rearward table 4 and hence the box-shaped structure 14 are rearward displaced together with the long material 1 held thereat by the suction by means of the cylinder 15. This is shown in FIG. 10c.

Thereafter, the extending direction of the front edge of the long material 1 and hence difference between the extending direction and the desired extending direction are detected by means of the two sensors 26 spaced in the width direction of the long material 1. Both tables 3 and 4 are then rotated about the pivotally supported axes through an angle corresponding to the detected difference in a direction for compensating the difference with the aid of the motor 18 and the arm member 22. This is shown in FIG. 10d. As a result, the front end portion of the long material 1 is somewhat deformed so that the extending direction of the front edge of the material 1 is brought exactly coincident with the direction perpendicular to the transfer direction A of the long material 1 as shown in FIG. 10d.

After the first modification of the front edge extending direction of the long material 1 has been carried out in this manner, the front end grasping means 7 is moved to a position corresponding to the front end portion of the long material 1 by means of the motor 68 and the timing belt 69. At this position, the cylinder 39 is actuated so as to lower the movable frame 40 to bring the long material 1 into contact with the channel-shaped member 42 as shown in FIG. 5a. At this time, moreover, the rocking arm 50 has been moved forward of the transfer direction of the long material 1 away from the movable frame 40 and hence clear of the channel-shaped member 42 with the aid of the horizontal cylinder 51.

Thereafter, the modified extending direction of the front edge of the long material 1 is held by suction caused by the vacuum pads 43 of the front end grasping means 7, while the suction holding of the long material by the rear end grasping table 4 is released. The movable frame 40 is then raised again to raise somewhat the front end portion of the long material 1. With this raised state, the previously opened rocking lever 50 is moved toward the channel-shaped member 42 by means of the horizontal cylinder 51. The rocking lever 50 is caused to perform its closing operation by the action of the horizontal cylinder 44 so that the long material 1 is clamped by the plate portion 50a of the rocking lever 50 and the underside of the channel-shaped member 42. Moreover, the cylinder 53 is actuated to pierce the long material with the needles 55.

The front end portion of the long material is sufficiently rigidly held by the front end grasping means 7 in this manner. The front end grasping means 7 is then moved through a predetermined distance on the common rails 8 by the actuation of the motor 68 and the timing belt 69 so that a predetermined length of the long material 1 is paid out through the cutting table 2.

In this case, after the front end portion of the long material 1 is delivered to the front end grasping means 7 and before the completion of the paying out of the long material 1, the forward and rearward tables 3 and 4 are rotated about their pivoted axes into the original positions and the box-shaped structure 14 of the rearward table 4 is also returned to the advanced position at a suitable time during the above time.

Thereafter, the cutter unit 5 which has been returned to the retracted limit position as shown in FIG. 1 is moved again to the intermediate position between the forward and rearward tables 3 and 4. In this position, the long material 1, held against the tables 3 and 4 by suction caused by the vacuum pads, is cut by means of the cutter unit 5 into a belt-shaped member S having a predetermined length in the same manner as above described. FIG. 10f illustrates the cut condition of the belt-shaped member S in a plan view. In this cutting operation, the cut direction is greatly affected by the extending direction of the reinforcing cords. Therefore, extending directions of the rear edge of the belt-shaped member S and the front edge of the long material 1 are mostly somewhat inclined relative to the desired direction perpendicular to the transfer direction, respectively.

Therefore, the box-shaped structure 14 of the rearward table 4 is retracted again as shown in FIG. 10g. Under this condition, extending directions of the rear edge of the belt-shaped member S and the front edge of the long material 1 are detected by directly detecting the extending direction of the front edge of the long material by means of the sensors 26. Inclined angles of both the edges relative to the desired extending direction are obtained on the basis of the detected results. Thereafter, both the tables 3 and 4 are rotated about the respective pivoted axes as shown in FIG. 10h so that the extending directions of the respective edges are simultaneously brought into coincident with the desired extending directions with high accuracy.

With respect to the belt-shaped member S whose rear edge has been modified to be coincident with the desired direction, the rear end grasping means 6 is moved to the position of the rear end portion of the belt-shaped member S. The rear end portion of the belt-shaped member S is rigidly held without changing the extending direction of the rear edge in the same manner as the front end portion of the long material 1 held by the front end grasping means 7. Thereafter, the belt-shaped member S whose front end portion has been previously rigidly held by the front end grasping means 7 is transferred to a predetermined position with the aid of both the front and rear end grasping means 6 and 7 in cooperation with each other. The belt-shaped member S thus is brought into a position above the plate-shaped transfer means 9. At the same time, the cylinder 63 provided on the rear end grasping means 6 is actuated to pull the vertical plate 61 and the rear end portion of the belt-shaped member S toward the stationary frame 38, so that the belt-shaped member S is subjected to tensile forces. Consequently, any slack caused by modification of the extending direction of the edge and other reasons are taken up by the tensile forces. In addition, the belt-shaped member is preferably elongated to a some extent by the tensile forces.

Figure 11:
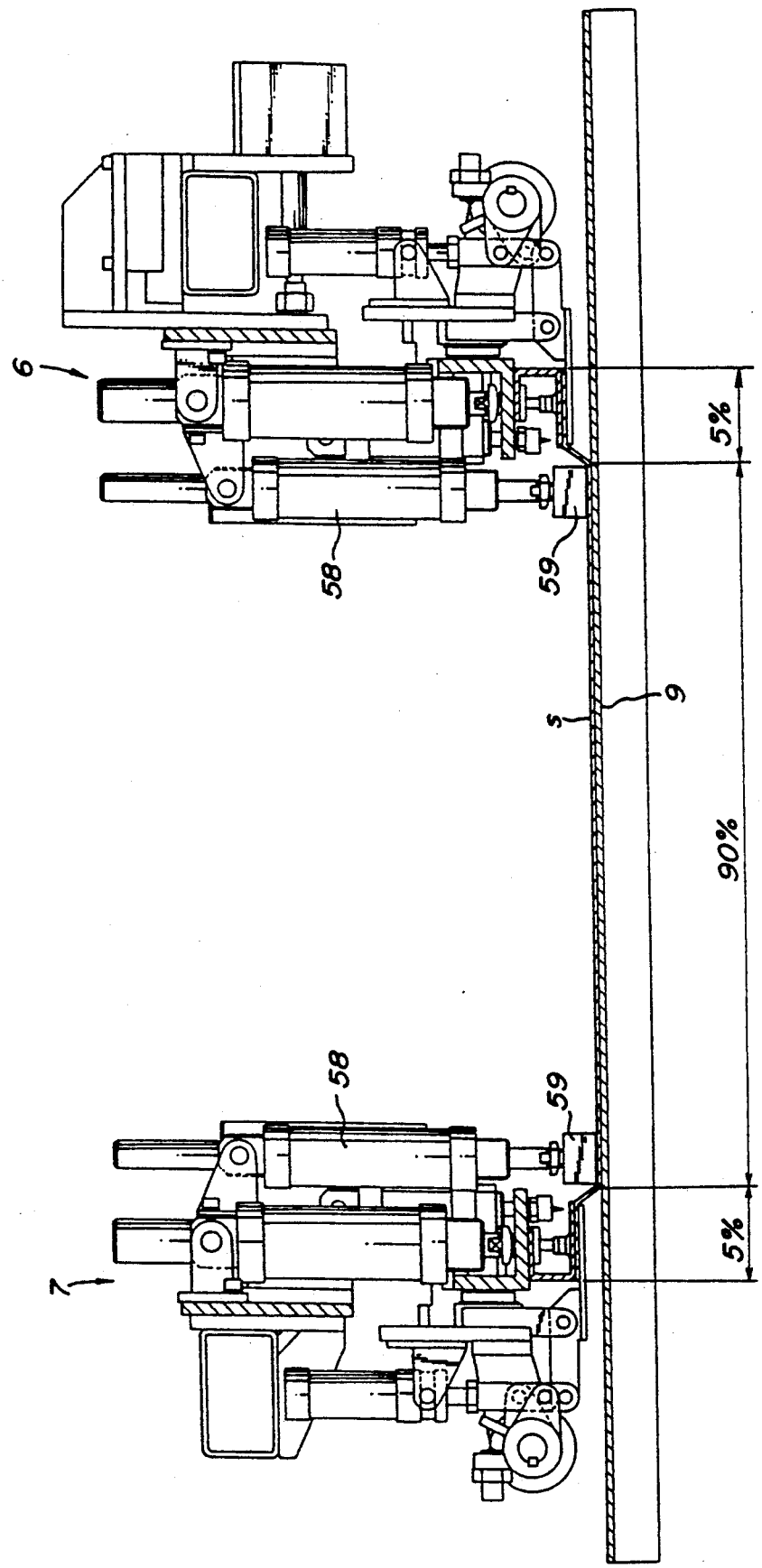
FIG. 11 is a side view illustrating a transferring state of the belt-shaped member to the plate-shaped transfer means.

The belt-shaped member S thus in the desired shape and size is then moved to a position sufficiently near the plate-shaped transfer means 9 by actuating the cylinders 39 of both the rear and front end grasping means 6 and 7. Then, the cylinders 58 of the rear and front end grasping means 6 and 7 are actuated to lower the restraining blocks 59 so that portion of the belt-shaped member S positioned below and between the blocks 59 are brought completely in surface contact with the plate-shaped transfer means 9 over a length of the belt-shaped member S. This is preferably more than 90% of the length and the parts of the belt-shaped member S are held by electrostatic suction plate of the plate-shaped transfer means 9 as shown in FIG. 11.

The remaining portion of the belt-shaped member S is held by electrostatic attraction to the plate-shaped means 9 in the following manner. After stopping the supply of negative pressure to the vacuum pads of the rear and front end grasping means 6 and 7 and removal of the needles 55 from the belt-shaped member S in a predetermined order, the rocking arms of both the rear and front end grasping means 6 and 7 are opened or rotated downwardly and moved in a horizontal direction away from the channel-shaped member 43 by means of the horizontal cylinders 51.

In this case, moreover, the electrostatic attractive force acting upon the belt-shaped member S against the plate-shaped transfer means 9 is sufficiently larger than a regaining force of the belt-shaped member S to its initial shape and the belt-shaped member S is firmly held in the modified state by the suction against the plate-shaped transfer means 9 over most of the length of the belt-shaped member S, preferably more than 90% of its length. Therefore, the extending directions of the front and rear edges of the belt-shaped member S do not return to their cut directions. This occurs even if the front and rear end portions of the belt-shaped member S are held by the suction against the plate-shaped transfer means 9 under the condition completely free from external forces or condition void of modifying action for the inclined cut edges after the first holding of the most part of the member S by suction.

Accordingly, thereafter, the plate-shaped transfer means 9 is advanced together with the belt-shaped member S held thereat by suction by means of driving means for the transfer means 9 such as a rack and pinion, cylinder or other suitable reciprocative driving means. The belt-shaped member S is supplied to the rotating winding drum 10 in synchronism with the advancement of the plate-shaped transfer means 9 in this manner.

Consequently, while the belt-shaped member S is attracted by some force to an outer circumference of the winding drum 10 by magnetic force or other suitable attractive force, the belt-shaped member S is wound around the winding drum 10 keeping the electrostatic attractive force of the belt-shaped member S to the plate-shaped transfer means 9. Preferably, there is an overlap of 2 to 6 mm at the front and rear end portions of the belt-shaped member S when the winding is completed.

As above described, before winding of the belt-shaped member S around the winding drum 10, the belt-shaped member S is modified to bring the extending directions of the front and rear edges to desired directions and corrected into a desired shape and a size by removing any slacks and adjusting the length thereof with the aid of the rear and front end grasping means 6 and 7 in cooperation with each other. Thereafter, the belt-shaped member S is supplied keeping sufficiently the modified condition onto the winding drum 10. Therefore, after winding the belt-shaped member S around the winding drum 10, the front and rear end portions of the belt-shaped member S uniformly overlap with each other with a suitable amount all over the width of the winding drum 10. Accordingly, there is no need for any manual modifying operation of the overlapped portion after winding the belt-shaped member S around the winding drum 10.

After completion of supply of one belt-shaped member S, an extending direction of a rear edge of the belt-shaped material S is modified and simultaneously an extending direction of a front edge of the long material 1 is also modified. The front end portion of the long material 1 is then held by means of the front end grasping means 7. Thereafter, paying out and cutting the long material 1, modification of cutting edge angles and other operations are repeated in the similar manner as above described.

The present invention has been explained by referring to the embodiment shown in the drawings. The cylinder 63 for a tensioning mechanism for applying tensile force to the belt-shaped member S may be provided only on the front end grasping means or on both the front and rear end grasping means.

Moreover, this invention is applicable to the case where the reinforcing cords extend in direction not perpendicular to the transferring direction of the long material 1, that is to say, applicable to materials having bias cords.

As can be seen from the above description, according to the invention the operations from cutting a constant length belt-shaped member to supplying the belt-shaped member onto the winding drum can be completely automatized in a relatively easy manner. Moreover, a belt-shaped member can be always properly wound around the winding drum without requiring any manual modification according to the invention.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A belt-shaped member supplying method for cutting a long material paid out of a winding roll into a belt shaped member of a predetermined length and supplying the belt-shaped member onto a winding drum, comprising steps of; modifying an extending direction of a front edge of said long material, whose initial front end portion has been cut off, into a desired direction by applying a force upon a front end portion of the long material, holding the front end portion of the long material, paying out the long material of a predetermined length, cutting the pad out long material to form a belt-shaped member, changing an extending direction of a rear edge of the belt-shaped member into a desired direction by applying a force upon a rear end portion of the belt-shaped member, holding the rear end portion of the belt-shaped member, transferring the entire belt-shaped member to a predetermined position, taking up any slack of the belt-shaped member, holding the belt-shaped member against a plate-shaped transfer means, and moving the plate-shaped transfer means together with the belt-shaped member to the winding drum.

2. The method as set forth in claim 1, wherein the step of changing the extending direction of the front edge of the long material, comprises the steps of; detecting a difference between the extending direction of the front edge of the long material and the desired direction and; rotating a table supporting the material through an angle corresponding to the detected difference in a direction for compensating the difference.

3. The method as set forth in claim 1, wherein the step of holding the front end portion of the long material after modifying the extending direction of the front edge of the long material comprises, holding the front end portion of the long material by one of vacuum pads, clamping between plates and piercing needles into the material provided on a front end grasping means.

4. The method as set forth in claim 1, wherein the step of modifying the extending direction of the rear edge of the belt-shaped member comprises, detecting a difference between the extending direction of the rear edge of the belt-shaped member and the desired direction, is detected and rotating tables supporting the belt-shaped member and a remaining long material, respectively, through an angle corresponding to the detected difference in a direction for compensating the difference.

5. The method as set forth in claim 4, wherein the step of detecting the difference between the extending direction of the front edge of the belt-shaped member and the desired direction comprises, detecting the extending direction of the rear edge of the belt-shaped member by detecting an extending direction of a front edge of the remaining long material.

6. The method as set forth in claim 4, wherein the step of holding the rear end portion of the belt-shaped member after modifying the extending direction of the rear edge of the belt-shaped member, comprises, holding the rear end portion of the belt-shaped member by one of suction caused by vacuum pads, clamping between plates and piercing needles into the material provided on a front end grasping means.

7. The method as set forth in claim 1, wherein in the step of taking up the slack of the belt-shaped member, a holding portion of a rear end grasping means holding the rear end portion of the belt-shaped member is moved rearward so that the belt-shaped member is subjected to tensile force.

8. An apparatus for supplying a belt-shaped member, comprising a cutting table for holding a long material paid out of a winding roll, a cutter unit for cutting the long material on the cutting table, sensor means for detecting extending directions of cut edges of the material cut by the cutter unit, front end grasping means for holding a front end portion of the long material to pay out a predetermined length of the long material, rear end grasping means for holding a rear end portion of a belt-shaped member obtained by cutting off the long material and transferring the belt-shaped member to a predetermined position in cooperation with the front end grasping means, plate-shaped transfer means for receiving the belt-shaped member from the front and rear end grasping means and supplying the belt-shaped member, while holding it at a predetermined position, to a winding drum, and tensioning means provided on at least one of said front and rear end grasping means for applying tensile force to the belt-shaped member Supported by the front and rear end grasping means, and said cutting table comprising a forward table arranged on a forward side of a transfer direction of the belt-shaped member and a rearward table movable toward and away from the forward table, said forward and rearward tables being rotatable in unison about their respective pivoted positions which are at centers of their widths and the former pivoted position being at a rear edge of the forward table and the latter pivoted position being at a front edge of the rearward table which has retracted from the forward table.

9. The apparatus for supplying a belt-shaped member as set forth in claim 8, wherein said rearward table comprises a lower frame whose substantially center portion somewhat spaced rearward from the forward table and a box-shaped structure arranged movable forward and rearward relative to the lower frame, said lower frame is provided with a motor driving a male screw member which is threadedly engaged in a female screw member rotatable in a horizontal plane, and the the forward table is rigidly connected to the lower frame of the rearward table by an arm member.

10. The apparatus for supplying a belt-shaped member as set forth in claim 8, wherein said cutter unit comprises a vertically movable frame, driving means provided on the movable frame, whose output shaft has a pinion fixed thereto, two racks in mesh with the pinion at diametrically opposed positions of the pinion, a guide rod horizontally arranged on the movable frame, cutter holders fixed to the racks and guided by the guide rod in its slidable movement therealong for holding cutters.

11. The apparatus for supplying a belt-shaped member as set forth in claim 8, wherein said front end grasping means comprises a stationary frame, a movable frame connected to the stationary frame by means of a movable frame moving cylinder and guided in vertical movements relative to the stationary frame by guide means, a channel-shaped member fixed to an underside of the movable frame and having a plurality of vacuum pads whose end openings are exposed through through-holes formed in the channel-shaped member, a restraining block moving cylinder fixed to the stationary frame, a horizontally extending restraining block connected to a piston rod end of the restraining block moving cylinder and guided in lifting movement relative to the stationary frame by guide means, a vertically arranged cylinder whose rod end is connected to a lower arm of a bell crank fixed to a shaft, a link member for connecting an upper arm of the bell crank to a rocking lever having a plate portion, and a horizontal cylinder for moving the vertically arranged cylinder, the bell crank, the link member and the rocking lever toward and away from the movable frame.

12. The apparatus for supplying a belt-shaped member as set forth in claim 8, wherein said rear end grasping means comprises a stationary frame, vertical plate horizontally movable relative to the stationary frame and guided by a straight guide, a vertical plate moving cylinder whose piston rod end is connected to the vertical plate, a movable frame connected to the vertical plate by means of a movable frame moving cylinder fixed to the vertical plate and guided in vertical movements relative to the stationary frame by guide means, a channel-shaped member fixed to an underside of the movable frame and having a plurality of vacuum pads whose end openings are exposed through through-holes formed in the channel-shaped member, a restraining block moving cylinder fixed to the vertical plate, a horizontally extending restraining block connected to a piston rod end of the restraining block moving cylinder and guided in lifting movement relative to the vertical plate by guide means, a vertically arranged cylinder whose rod end is connected to a lower arm of a bell crank fixed to a shaft, a link member for connecting an upper arm of the bell crank to a rocking lever having a plate portion, and a horizontal cylinder for moving the vertically arranged cylinder, the bell crank, the link member and the rocking lever toward and away from the movable frame.

13. The apparatus for supplying a belt-shaped member as set forth in claim 8, wherein said tensioning means comprises a holding portion of the rear end grasping means for holding the rear end portion of the belt-shaped member and movable in a longitudinal direction of the belt-shaped member toward and away from the rear end grasping means.

* * * * *